B. D. COPPAGE.
RECEPTACLE AND MOUNTING THEREFOR.
APPLICATION FILED AUG. 29, 1914.
1,235,115.
Patented July 31, 1917.
10 SHEETS—SHEET 1.
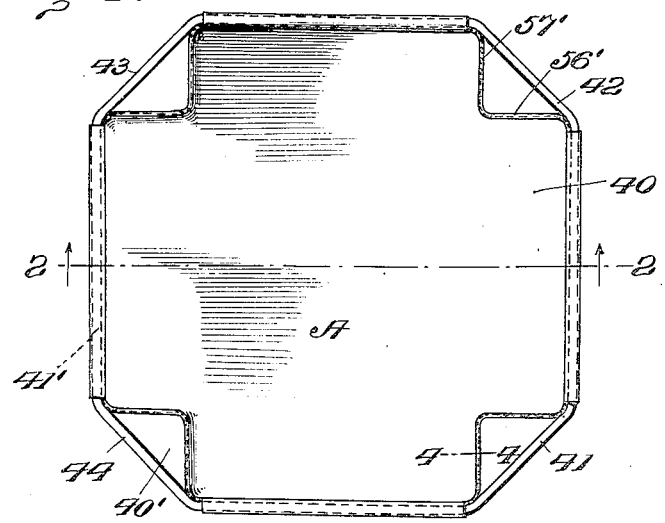
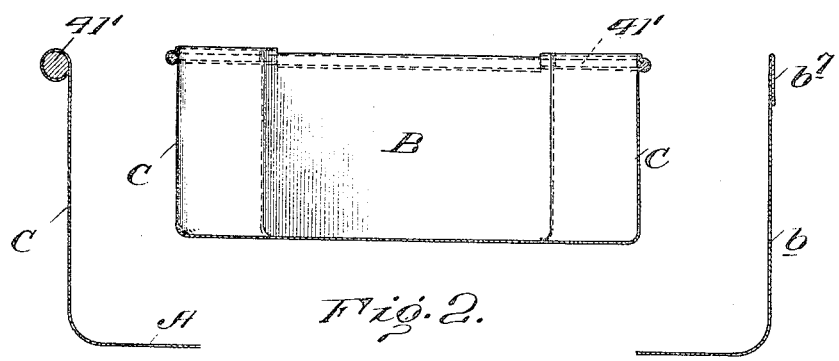
WITNESSES:
J. B. Wegenast
Jas. H. Anderson
INVENTOR.
Benjamin Denver Coppage
BY
Mauro, Cameron, Lewis & Massie
ATTORNEYS

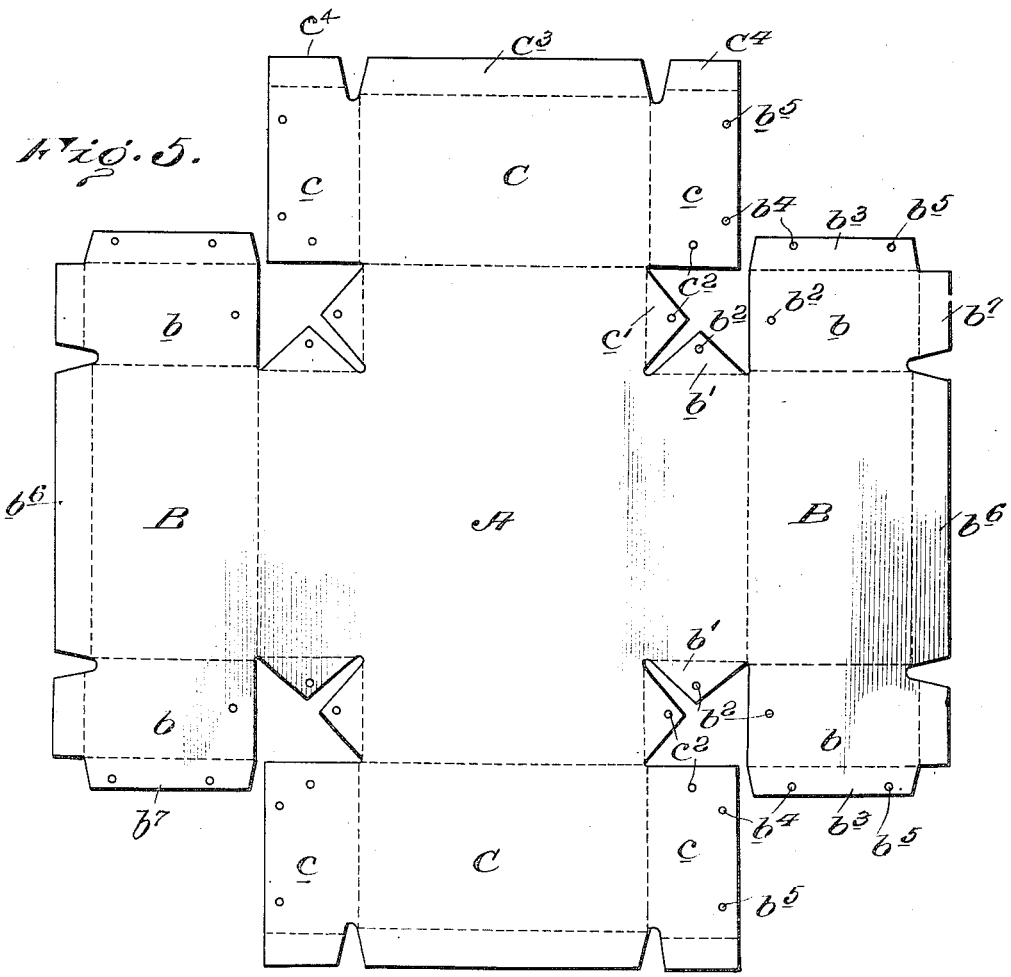

B. D. COPPAGE.
RECEPTACLE AND MOUNTING THEREFOR.
APPLICATION FILED AUG. 29, 1914.
1,235,115. Patented July 31, 1917.
10 SHEETS—SHEET 3.
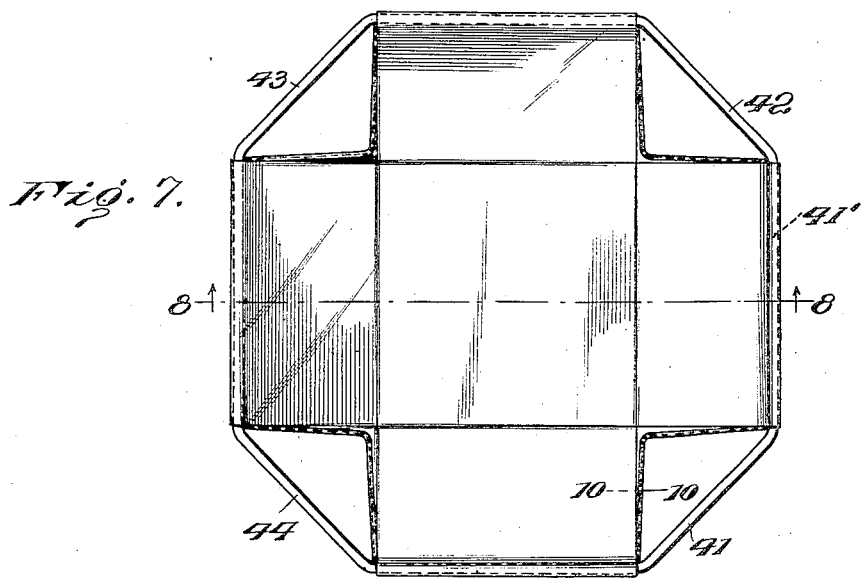
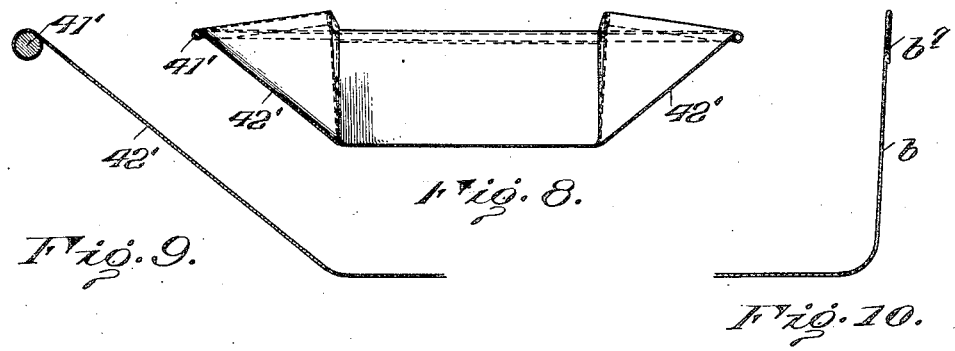
WITNESSES:
J. B. Wegenast.
Jas. H. Anderson.
INVENTOR.
Benjamin Dewar Coppage
BY
Mauro, Cameron, Lewis & Massie
ATTORNEYS

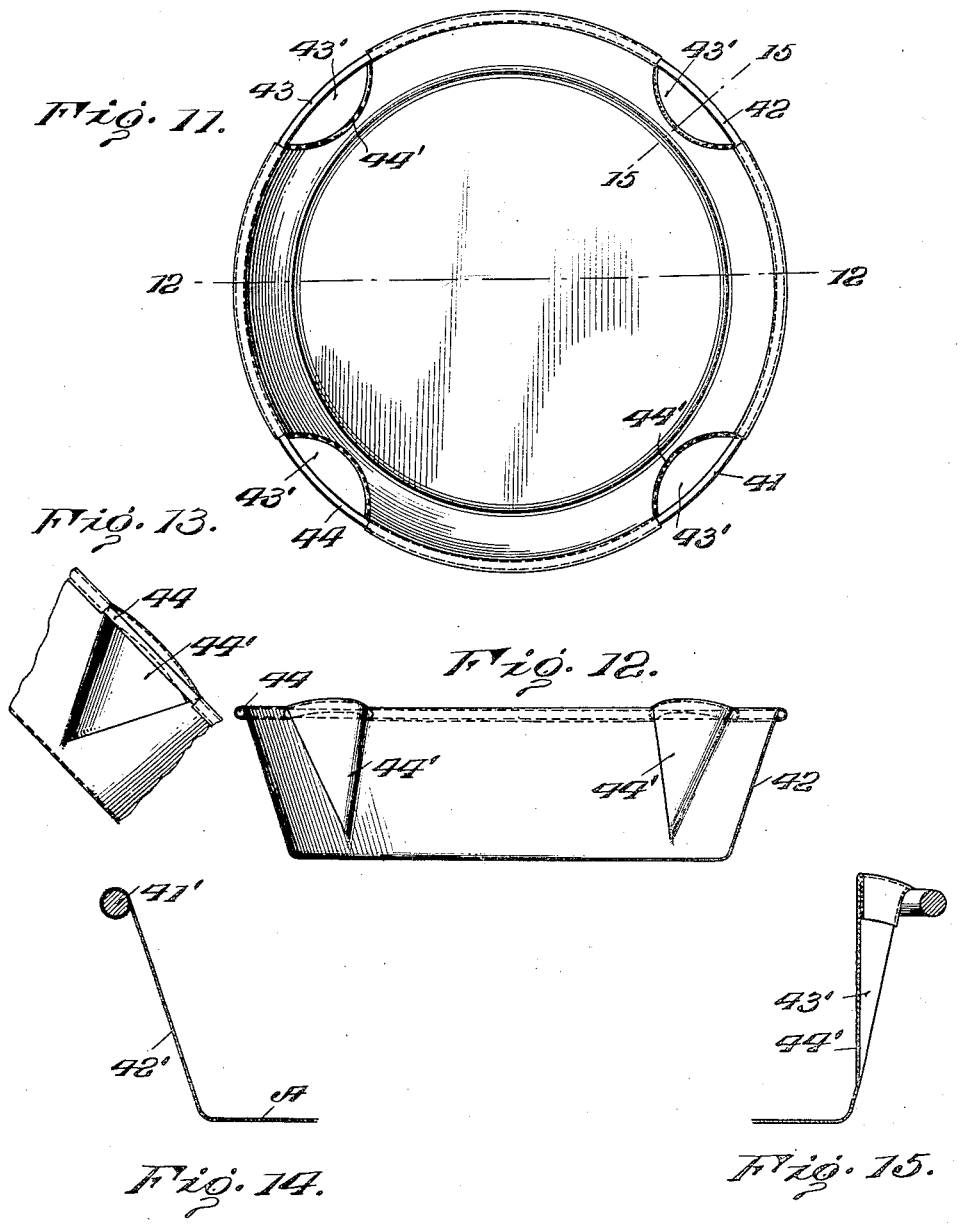

B. D. COPPAGE.
RECEPTACLE AND MOUNTING THEREFOR.
APPLICATION FILED AUG. 29, 1914.
1,235,115.
Patented July 31, 1917.
10 SHEETS—SHEET 5.
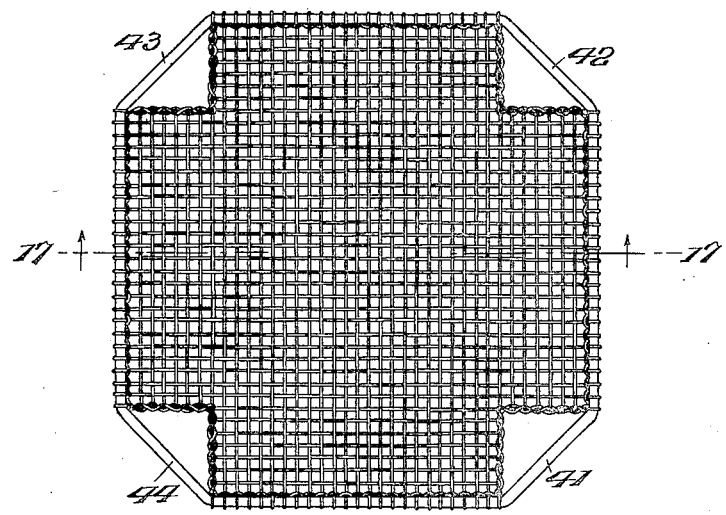
Fig. 16.
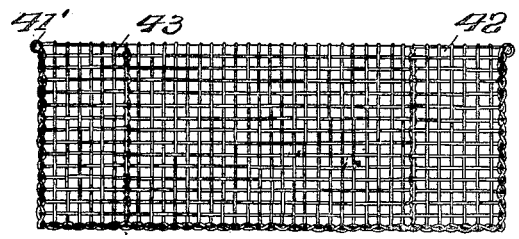
Fig. 40. Fig. 17. Fig. 41.
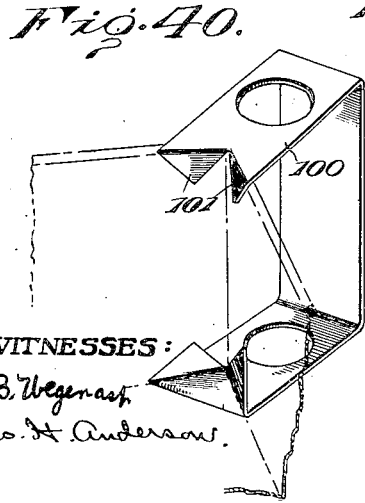
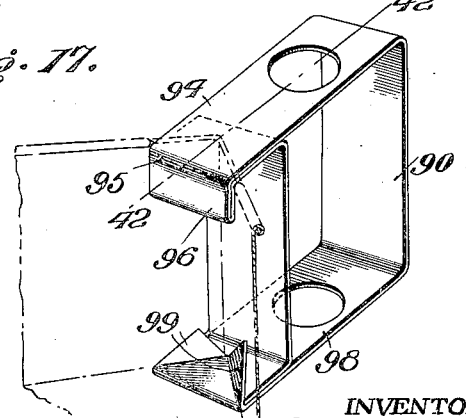
WITNESSES:
I. B. Wegenast
Jas. H. Anderson.
INVENTOR.
Benjamin Denver Coppage
BY
Mauro, Cameron, Lewis & Massie
ATTORNEYS

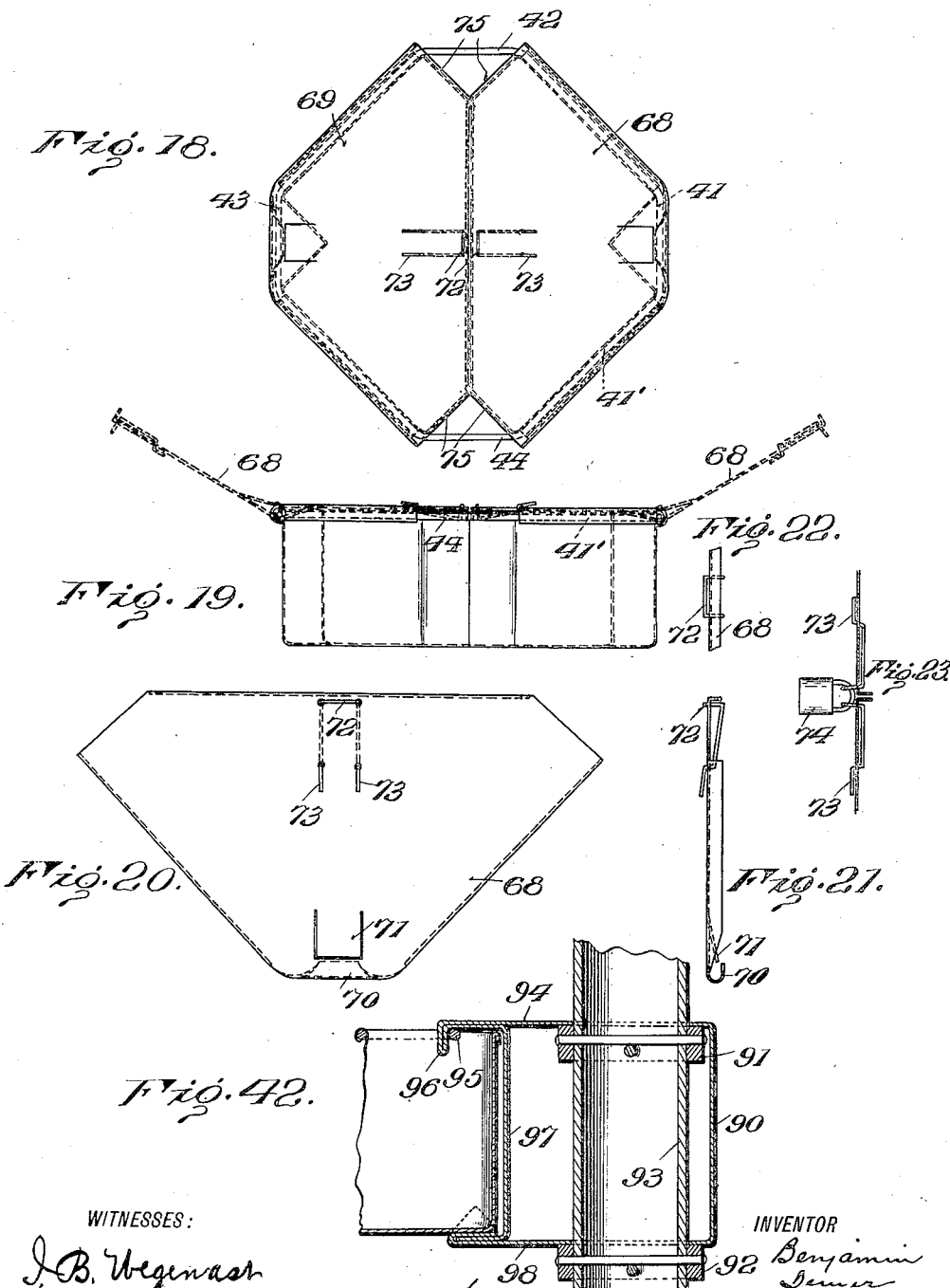

B. D. COPPAGE.
RECEPTACLE AND MOUNTING THEREFOR.
APPLICATION FILED AUG. 29, 1914.
1,235,115.
Patented July 31, 1917.
10 SHEETS—SHEET 7.
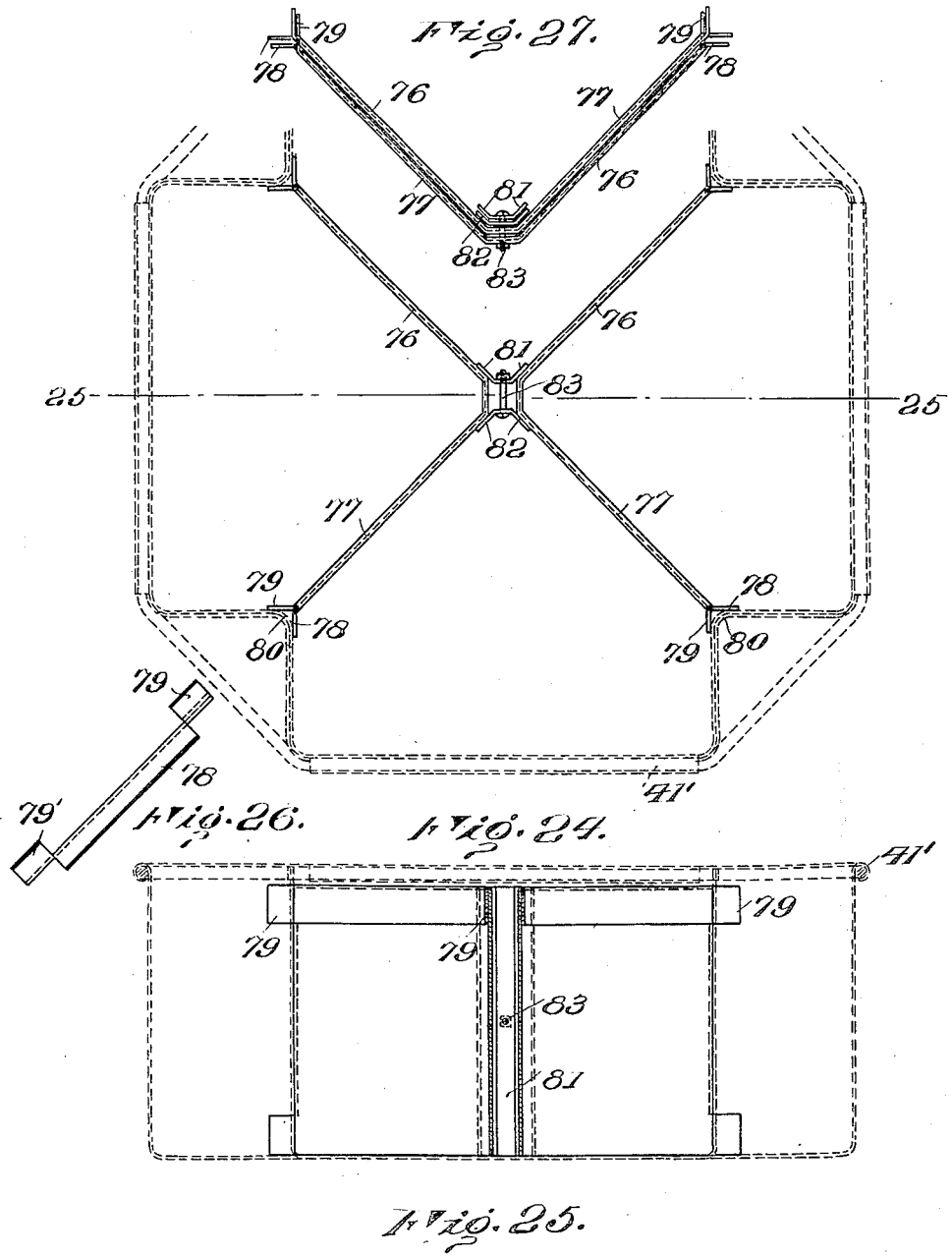
WITNESSES:
INVENTOR
Benjamin Denver Coppage
BY
Mauro, Cameron, Lewis & Massie
ATTORNEYS

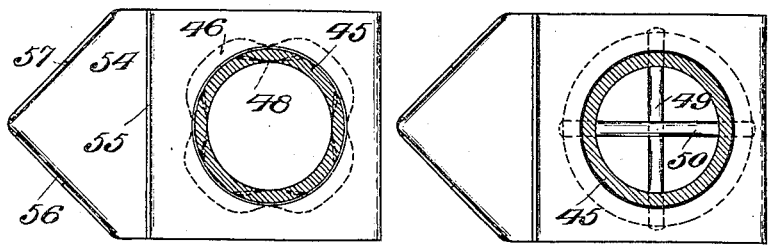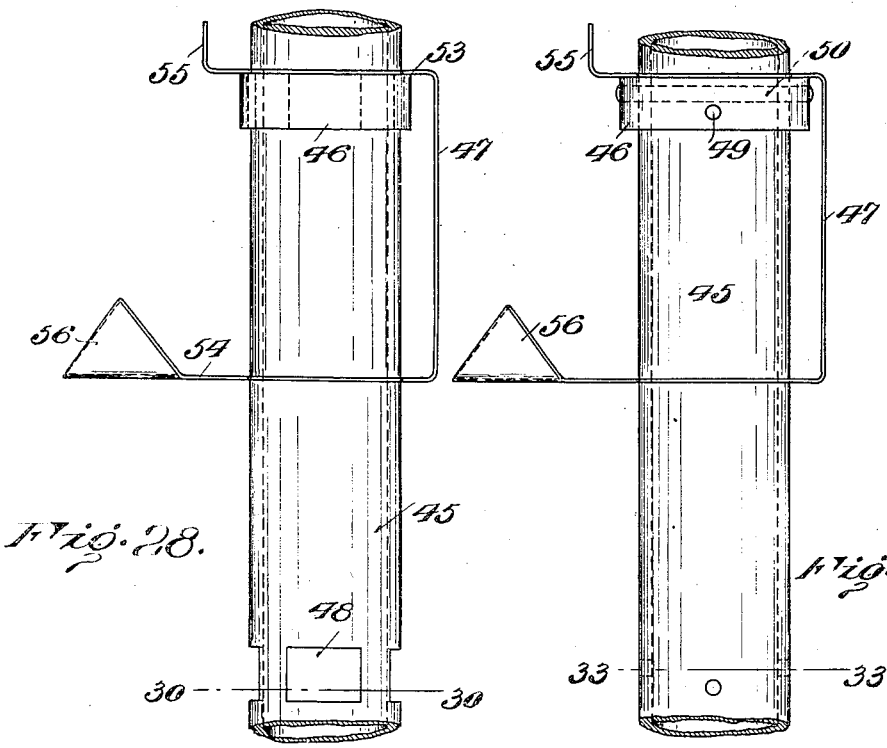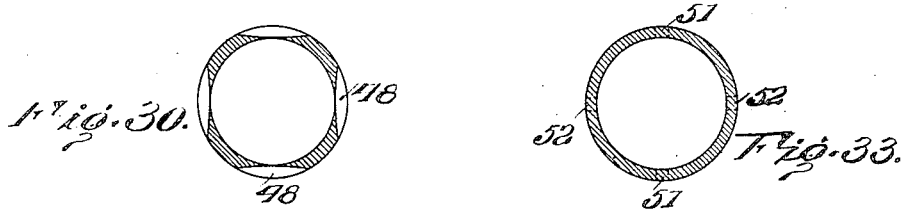

B. D. COPPAGE.
RECEPTACLE AND MOUNTING THEREFOR.
APPLICATION FILED AUG. 29, 1914.
1,235,115.
Patented July 31, 1917.
10 SHEETS—SHEET 9.
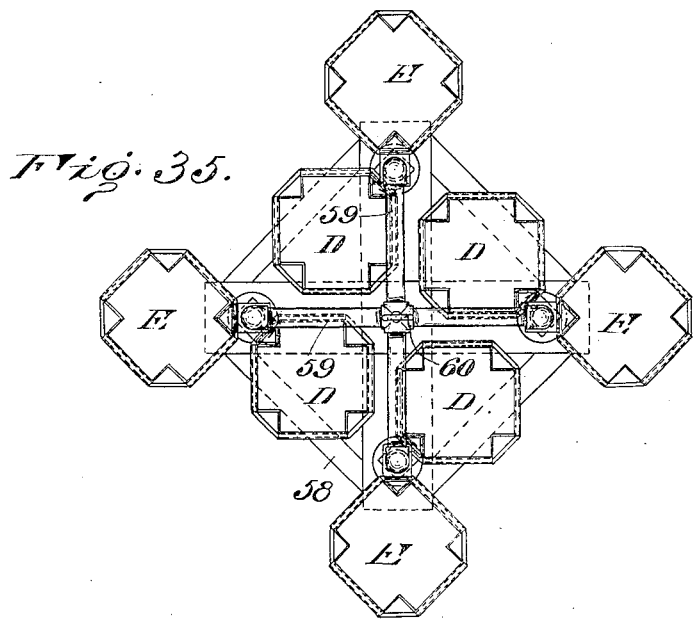
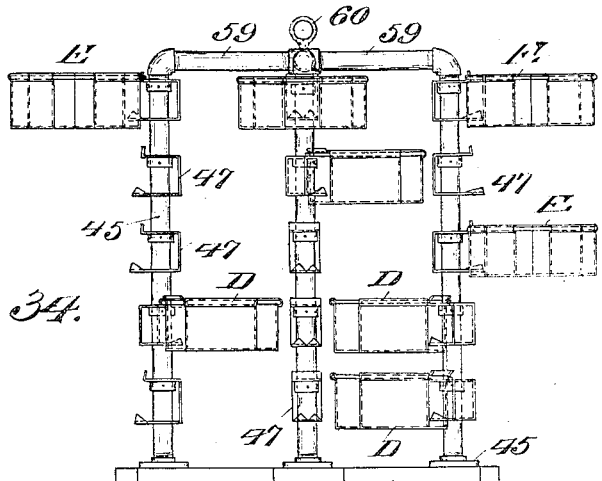
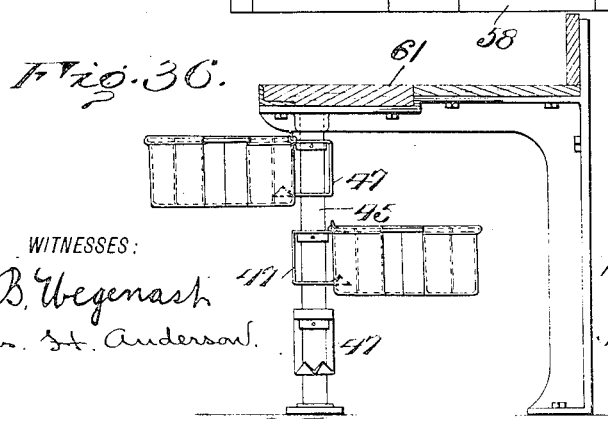
WITNESSES:
INVENTOR
Benjamin Dower
Coppage
BY
Mauro Cameron
ATTORNEYS

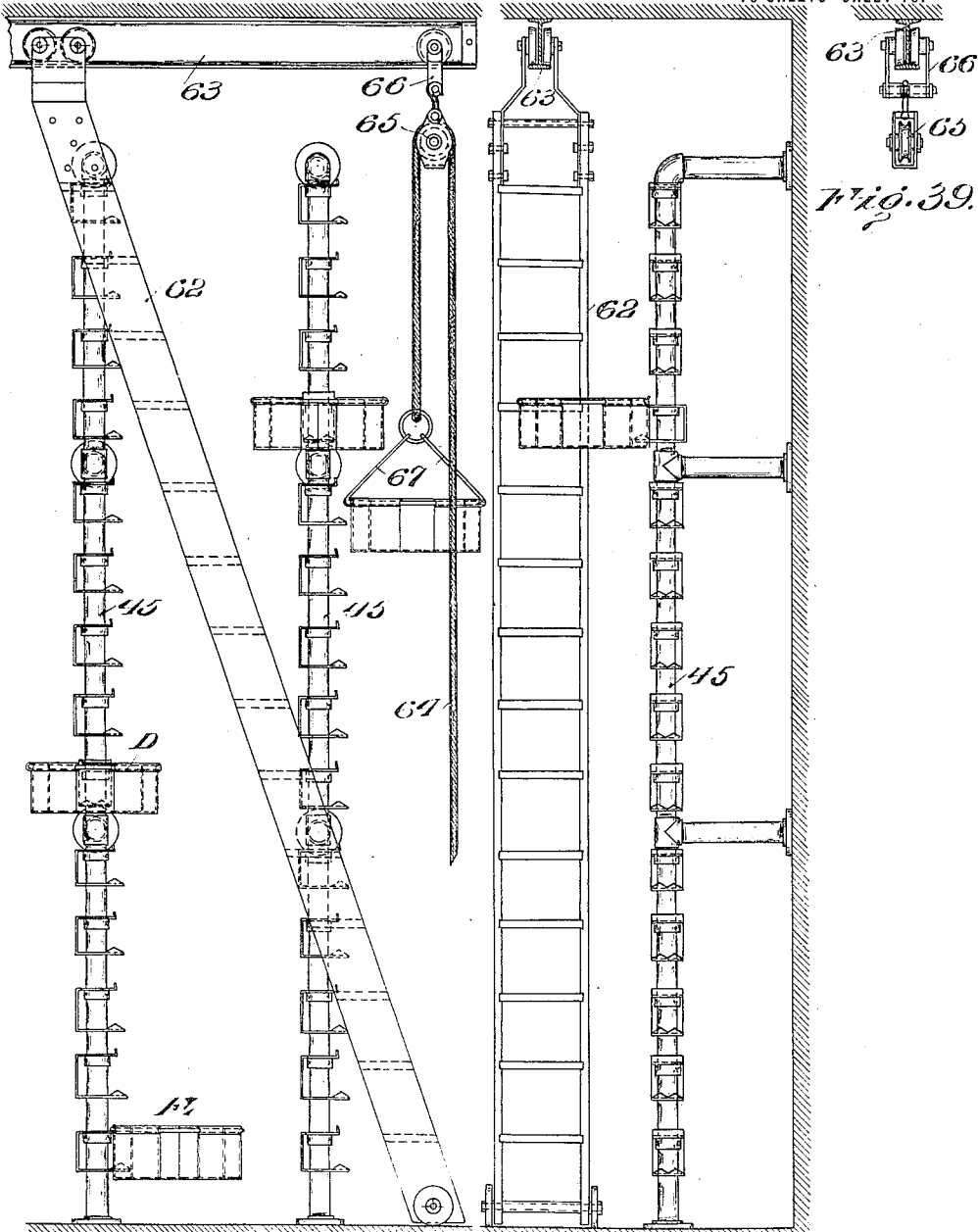

UNITED STATES PATENT OFFICE.

BENJAMIN DENVER COPPAGE, OF WILMINGTON, DELAWARE.

RECEPTACLE AND MOUNTING THEREFOR.

1,235,115.      Specification of Letters Patent.      Patented July 31, 1917.

Application filed August 29, 1914. Serial No. 859,211.

*To all whom it may concern:*

Be it known that I, BENJAMIN DENVER COPPAGE, a citizen of the United States of America, and a resident of Wilmington, Delaware, have invented a new and useful Improvement in Receptacles and Mountings Therefor, which invention is fully set forth in the following specification.

The present invention is an improvement in receptacles and the mounting thereof, and particularly in receptacles especially suitable for the storage and transportation of objects and materials too small to be handled piece by piece or of such a nature as to be impracticable of handling except by the use of a suitable receptacle or container.

The invention has among its principal objects to provide a strong and serviceable container or receptacle or " toter " having a number of handles (preferably four), and a support for said toters on which they may be readily placed and from which they may be readily removed, the said handles being engaged in holding and supporting the receptacles in position on the support and in removing the same therefrom. Further, the mounting of the receptacles on their support is such that they may be readily swung from an out-of-the-way position to an easily accessible and removable position, and vice versa. Preferably a plurality of receptacles are mounted one above the other on the same standard or support to constitute upright rows, tiers or stacks, the mounting being such as to enable the individual receptacles or "toters" to be removed from their supporting members without the labor of moving or interfering with the other toters in the same tier and without spilling the contents of the toter so removed.

A further object is the adaptation of such means to uses such as in mercantile houses for gathering orders, in hotel kitchens for sorting food, dishes, etc., and particularly in factories where small parts are made or stored and transported to places of use, assembling or shipment. The feature of having a large number of receptacles compactly mounted in upright tiers or stacks, yet with each individual receptacle readily removable and accessible for examination without moving other neighboring receptacles, is of great utility and importance. For example, materials and parts may thus be appropriated and set aside in toters for special uses, each toter and its location being identified by suitable markings, the latter being also entered in appropriate directory records. If desired, the toters may be provided with covers and locked and sealed; their interior may also be partitioned off into compartments. Obviously characteristics such as above recited are conducive to order, system, saving of materials and elimination of waste, saving of time and labor, and are available to the facilitation of the assembly of mechanisms of all classes, from watches to locomotives.

Still further objects concern the making of the receptacle or toters of such shape and structure as to best adapt them for the particular uses in view; to provide them with handles of great strength conveniently positioned without objectionably protruding; to provide covers, preferably in two sections for each receptacle, each section being readily detachable from a handle to hinge thereon, and each section preferably having a non-protruding handle which may also serve for engagement of a lock or seal; to make the receptacles of such form that they may, when empty, be closely nested one within another to save space in storage or shipment thereof; and to provide breakdown partitioning capable of being readily applied to divide a receptacle into compartments, the parts of such partition being also adapted to compact nesting for storage or shipment.

The before recited and still other objects and advantages attained will be more readily understood by reference to the accompanying drawings illustrative of several preferred embodiments of the invention, it being understood that the principle thereof is not restricted to these expressions of the inventive idea. In said drawings:—

Figure 1 is a plan view of one form of receptacle or toter;

Fig. 2 is a sectional view on line 2—2 of Fig. 1;

Fig. 3 is an enlarged detail section on the same line;

Fig. 4 is a sectional view on line 4—4 of Fig. 1;

Fig. 5 is a plan view of a sheet metal blank from which the preferred form of receptacle or toter is formed;

Fig. 6 is a perspective view of a toter made from the blank shown in Fig. 5;

Fig. 7 is a plan view of a different form of toter;

Fig. 8 is a sectional view on line 8—8 of Fig. 7;

Fig. 9 is an enlarged sectional detail on the same line;

Fig. 10 is a sectional view on line 10—10 of Fig. 7;

Fig. 11 is a plan view of another form of receptacle or toter;

Fig. 12 is a section on line 12—12 of Fig. 11;

Fig. 13 is a detail elevation;

Fig. 14 is an enlarged sectional detail on line 12—12 of Fig. 11;

Fig. 15 is a section on line 15—15 of Fig. 11;

Fig. 16 is a plan view of another form of toter;

Fig. 17 is a section on line 17—17 of Fig. 16;

Fig. 18 is a plan view showing a two-part cover detachably hinged to handles of the receptacle or toter;

Fig. 19 is an elevation of a toter showing the cover in full lines closed and in dotted lines open;

Fig. 20 is a plan view of one of the cover sections;

Fig. 21 is an edge view of the same;

Fig. 22 is a detail elevation showing the lock or lift loop or bail;

Fig. 23 is a detail sectional view showing parts of the two cover sections locked together;

Fig. 24 is a plan view showing an improved form of partition applied to the toter, whereby the interior of the same is divided into compartments;

Fig. 25 is a sectional elevation on line 25—25 of Fig. 24;

Fig. 26 is an end elevation of one of the partition members;

Fig. 27 is a detail view showing the partition members and their fastening devices nested;

Fig. 28 is an elevation of part of a support or standard with a supporting member thereon for a receptacle or toter;

Fig. 29 is a plan view corresponding to Fig. 28;

Fig. 30 is a sectional view on the line 30—30 of Fig. 28;

Fig. 31 is an elevation similar to Fig. 28, but showing a different form of bearing ring for the supporting member;

Fig. 32 is a plan view of the structure shown in Fig. 31;

Fig. 33 is a sectional view on line 33—33 of Fig. 31;

Fig. 34 is an elevation showing one form of supporting structure with a number of toters supported therefrom;

Fig. 35 is a plan view of the structure of Fig. 34;

Fig. 36 is a detail view showing mountings for a plurality of toters under a bench or counter;

Fig. 37 is an elevation of an installation showing a plurality of upright tiers of toters, with a ladder for reaching toters at the top, and a block and tackle on a trolley for lowering toters;

Fig. 38 is a view in elevation at right angles to Fig. 37;

Fig. 39 is a detail of the trolley device shown in Fig. 37;

Fig. 40, Sheet 5, is a detail perspective illustrating means of the invention adapted to detachably engage an angular and handleless corner of a receptacle to removably sustain the same from a suitable support;

Fig. 41, Sheet 5, similarly illustrates means of the invention adapted to detachably engage an angular corner of a receptacle and a handle spanning said corner to removably sustain the same from a suitable support;

Fig. 42, Sheet 6, is a vertical sectional view on line 42—42 of Fig. 41, including illustration of part of a supporting standard not shown in Fig. 41.

Referring to the drawings, Figs. 1–6 inclusive illustrate the preferred form of receptacle or toter for use in factories or mercantile houses. This toter is preferably of sheet metal, of cruciform shape, and formed from a single blank. The receptacle as a whole is indicated by the numeral 40. 41, 42, 43 and 44 are four handles disposed symmetrically and equidistant about the receptacle and secured in place along the upper edge thereof. Preferably these handles are of a single piece of heavy wire or rod 41' that spans indented or reëntrant portions such as the corners 40' of the toter, and the wire is secured in place by having folds $b^6$ and $c^3$ (Fig. 5) passed around the same. Preferably the ends of the wire are welded together, and the wire is spot-welded, by a suitable electric welding process, to the folds $b^6$ and $c^3$. This manner of forming the handles of wire and of securing the latter in place provides handles of great strength—indeed, they are practically the strongest part of the receptacle and will withstand very rough usage. This is quite necessary for the reason that, in certain uses, the toters will contain a hundred pounds or more of metal parts, and it is of the first importance that the handles shall not pull out or give way under this weight when the toters are being transported from place to place, or suspended in position on their supporting members, as hereinafter described.

The particular construction of toter shown in Figs. 1–6 inclusive will be better understood by reference to Fig. 5, which is a plan view of a single blank that may be bent or folded into the finished article. A indicates the bottom of the sheet metal toter of cruciform shape, and B, B and C, C are folds that are bent up at right angles to bottom A. $b$ are flaps or folds, one of which extends from each end of fold B, and an additional flap or fold $b^3$ extends from each fold $b$. $c$ are flaps or folds extending from the fold C and said folds $c$ are bent at right angles to the fold C, in which position each fold $c$ is overlapped by a fold $b^3$, said folds $c$ and $b^3$ being secured together by any suitable means, as by rivets passing through perforations or holes $b^4$ and $b^5$. The flap $b'$ is bent at right angles to the bottom portion A and is secured to the outside of its associated fold $b$ by any suitable means, as by rivets passing through openings $b^2$. Flap $c'$ is bent at right angles to the bottom portion A and is secured to the folds $c$, as by rivets passing through holes $c^2$. As above indicated, the flaps or folds $b^6$ and $c^3$ are folded around the wire that constitutes handles 41, 42, 43 and 44, and may be soldered thereto if found desirable. Flaps $b^7$ and $c^4$ are turned down against the sides of the receptacle or toter, as best shown in Fig. 6.

The form of toter shown in Figs. 1–6 inclusive is not adapted for nesting, but may obviously be piled one upon another. An embodiment of the inventive idea as applied to a toter which is adapted for nesting is shown in Figs. 7 to 10 inclusive. This toter in all respects is similar to that shown in Figs. 1 to 6 inclusive, except that the sides 42', instead of being perpendicular, are sloped and the other upright walls slightly inclined away from the perpendicular, whereby a plurality of toters may be compactly nested.

A further form of a nesting toter is illustrated in Figs. 11 to 15 inclusive. The receptacle therein illustrated has a round bottom and the side of the receptacle is sloped so that one toter may be placed within another. This toter is of the usual pan shape and is particularly sanitary in view of the ease with which it may be cleaned. The side wall of the receptacle is indented or provided with reëntrant portions at 43' to provide space to be spanned by the handles. The indented parts 44' of the wall may be integrally formed with the main body of the receptacle, or separately and secured, as by solder, to said main body.

Figs. 16 and 17 show a preferred form of basket or reticulated toter made of wiremesh. While the construction shown in these figures is similar to that shown in Figs. 1 to 6 inclusive, except for the use of the wire-mesh, it will be readily understood that any of the other forms of toters described may also be made of wire-mesh—or of other desirable and suitable material. In all of the forms of toters described, the handles are so secured to the receptacles as to minimize the danger of pulling out under a heavy load, as when the toters are being transported or when they are mounted on supports and the strain of sustaining the load is thrown principally upon the handles.

A preferred form of means to be associated with a support to detachably and removably sustain a receptacle or toter from the support is shown in Figs. 29 to 33 (Sheet 8), wherein 45 is part of a support in the form of a tubular standard or column; heavy piping will generally serve. Bearing rings 46 are secured to the standard in any suitable way and at different elevations to allow proper clearance between the top of one receptacle and the bottom of that next above. In Figs. 31–33, pins 49, 50, passing through openings 51 and 52 in the standard, secure rings 46 in place. In Figs. 28–30, the standard is notched or recessed at 48 and the rings 46 bent into said recesses by hammering or otherwise. For sustaining each receptacle from a standard, there is a receptacle-engaging element 47, preferably a strong strip of metal bent to the shape shown, its two horizontal parts or members 53, 54 being formed with openings for the passage of the tubular support and the arm 53 resting against the bearing ring 46. At its free extremity, arm 53 is bent upward to form a hook adapted to engage one of the handles of a receptacle, as shown in Figs. 34–36; while the free extremity of arm 54 is bent to form two faces or surfaces 56, 57 diverging at right angles and adapted to closely fit the diverging surfaces of the indentation or reëntrant portion of the receptacle which is spanned by the particular handle engaged by hook 55. When it is desired to engage a receptacle with such means, the element 47 is turned to bring the hook 55 to the front, whereupon one of the handles 41, 42, 43 or 44 is placed over the hook and the receptacle lowered to place. This positions the faces 56 and 57 in contact with surfaces 56' and 57' (Fig. 1) of one of the indented portions of the receptacle or toter, preventing side tilting. Thereby is the receptacle supported in horizontal position, the main burden of sustaining the receptacle falling upon the hook 55. The toter having been thus placed in position, may then be swung to an out-of-the-way position, as shown, for example, at D, Figs. 34 and 35 (E in said figures indicating the toters in a more accessible position), the element 47 rotating about its standard.

Although that just described is now regarded as the preferred form, other forms of receptacle-engaging elements may be used, dependent to some extent upon the structure of the receptacle. In Figs. 41

(Sheet 5) and 42 (Sheet 6) there is shown a form of receptacle in which a handle 95 spans or crosses a right-angle corner of the receptacle, which corner projects beyond said handle. The receptacle-engaging element 90 rests against two bearing rings 91, 92 on standard 93. The upper arm 94 is formed with a downward pointing hook 96 engaging over handle 95. In forming said hook, the metal strip is doubled upon itself, extended downward in part 97, and the latter secured under the bent over extremity of lower arm 98, adding strength and rigidity to the structure. The parts 99, 99 of arm 98 are bent upward to form diverging side walls of a seat in which the lower corner of the receptacle rests. In this instance, the main burden of the load falls upon the lower arm. In Fig. 40, the receptacle-engaging means do not engage a handle, the upper arm having two downwardly bent diverging walls engaging inside of an angular corner of the receptacle.

As has already been suggested, the supporting members are so connected to the upright standard or column as to lie normally in superposed relationship to each other, and to hold the receptacles normally in superposed relationship to each other. Preferably as stated, the supports are movable, independently of each other, relatively to the standard, the movement being by preference a pivotal one about a vertical axis.

In Figs. 34 and 35, there is shown a quadruple stand or support, on which four upright tiers of toters may be mounted. This stand is composed of a base 58 on which are mounted four standards or supports 45 secured together by suitable cross pieces 59. A lifting-eye 60 is provided so that the stand may be readily elevated by any suitable means and transported from place to place. In Fig. 36, the standard or support 45 is shown as the leg of a bench or counter 61, three supporting members 47 and two toters being shown.

In Figs. 37 and 38, a ceiling high standpipe arrangement for the toters is shown, the number of toters mounted on the standards 45 in this installation being only limited by the height of the room. As heretofore described, the toters may be swung from their out-of-the-way position D to a more accessible position E. In order to inspect or remove the toters that may be mounted near the top of the standards 45, a rolling ladder 62 running on a rail 63 may be employed; and there may also be employed, if desired, a lifting and lowering rope 64 carried by a pulley 65 secured to a carriage 66 which engages the rail 63, said rope being provided with members or hooks 67 that engage the handles of the toter when the same is being elevated or lowered.

It is frequently desirable to protect the contents of the toters from theft or unauthorized handling and, to this end, there may be used as a part of the present invention a suitable cover. As here shown, this cover is in two parts or sections 68 and 69 which are identical, and each of which is provided with a hook or curved portion 70 that detachably engages around one of the handles 41, 42, 43 or 44, on which the cover section hinges. A tongue 71, preferably integral with its cover member 68 or 69, coöperates with the hooked part 70 to hold its cover member in position with respect to its associated handle. Each cover section is provided with a suitable lock and lift loop or bail 72, having two integral extensions 73 that project through openings in the cover members at an angle thereto. The construction is such that, when pressure is applied to these projections 73, the loop or bail 72 is raised above the surface of the cover section, so that it may be engaged to raise the cover, or to permit a lock 74 (Fig. 23) or seal to be passed through the loops or bails. While each cover section freely pivots around its associated handle, it may be readily removed *in toto* from engagement with said handle. As clearly shown in Fig. 18, these cover sections are cut away at 75, so that the handles 42 and 44 may be engaged either to transport the toter or receptacle, or to mount the same on a support such as heretofore described.

It has frequently been found desirable to subdivide the receptacles in order that various elements of small size may be contained in one receptacle or toter and yet the various kinds of articles be kept separate. While partitions may be provided which will divide the space in any desired manner, it has been found highly advantageous to employ a construction such as illustrated in Figs. 24–27 inclusive. As therein shown, two partition members are provided, each of which has a part 76 and a part 77 arranged at substantially right angles to each other. The free end of each of these parts is provided with lugs or wings 78, 79, 79', angularly disposed with relation to each other and adapted to engage an inwardly projecting corner 80 of the receptacle. Near the bend between the parts 76 and 77 angle pieces 81 and 82 engage the partition members, said pieces being held in position with respect to each other and the partition members by suitable means, as a bolt 83. When the partition members are not in use, they may be nested with each other and with the angle pieces 81 and 82, the whole being secured together by the bolt 83, as shown in Fig. 27.

While for the purpose of clearness various structures have been illustrated and described in detail, it is to be understood that the invention is not limited to the structures shown, but that the inventive idea is susceptible of various other expressions.

What is claimed is:—

1. The combination of a suitable support, a receptacle having a handle, and means on the support for removably sustaining the receptacle from said support, said means including a part adapted to make detachable engagement with the handle of the receptacle and another part engaging the receptacle at another point to prevent tilting thereof.

2. The combination of a suitable support, a receptacle having one or more angular corners, and means swingingly mounted on the support adapted to make detachable engagement with the receptacle to removably sustain the same from the support, said means including a part adapted to engage a corner of the receptacle.

3. The combination of a suitable support, a receptacle having an upright corner with diverging walls, and means swingingly mounted on the support adapted to make detachable engagement with the receptacle to removably sustain the same from the support, said means including a part adapted to engage the corner of the receptacle and contact with the two divergent walls of said corner.

4. The combination of a suitable support, a receptacle having an upright corner with sides of the receptacle diverging therefrom, and means on the support adapted to make detachable engagement with the receptacle to removably sustain the same from the support, said means including a part adapted to engage the corner of the receptacle, said part having diverging surfaces contacting the two divergent sides of the receptacle at said corner.

5. The combination of a suitable support, a receptacle having a handle and a corner, and means on the support adapted to make detachable engagement with the receptacle to removably sustain the same from the support, said means including a part adapted to engage the handle and a part adapted to engage the corner of the receptacle.

6. The combination of a suitable support, a receptacle having a handle and a corner with diverging walls, and means on the support adapted to make detachable engagement with the receptacle to removably sustain the same from the support, said means including a part adapted to engage the handle and a part having diverging surfaces adapted to contact the two divergent walls of the corner of the receptacle.

7. The combination of a suitable support, a receptacle having an indentation in its outer surface, and means on the support adapted to make detachable engagement with the receptacle to removably sustain the same from the support, said means including a part adapted to engage said indentation of the receptacle.

8. The combination of a suitable support, a receptacle having an indentation in its outer surface with diverging walls, and means on the support adapted to make detachable engagement with the receptacle to removably sustain the same from the support, said means including a part having diverging surfaces adapted to engage the diverging walls of the indentation of the receptacle.

9. The combination of a suitable support, a receptacle having an indentation in its outer surface and a handle bridging said indentation, and means on the support adapted to make detachable engagement with the receptacle to removably sustain the same from the support, said means including a part adapted to engage the handle and another part adapted to fit said indentation of the receptacle.

10. The combination of a suitable support, a receptacle having a divergent indentation in its outer surface and a handle spanning said indentation, and means on the support adapted to make detachable engagement with the receptacle to removably sustain the same from the support, said means including a part adapted to engage the handle and a part having diverging surfaces adapted to engage the diverging walls of the indentation of the receptacle.

11. The combination of a suitable support, a receptacle having a plurality of handles, and means on the support to removably sustain the receptacle from the support, said means comprising an element adapted to make detachable engagement with any one of said handles and an element coöperating therewith to maintain said receptacle in horizontal position.

12. The combination of a suitable support, a receptacle having a plurality of handles, and means on the support to removably sustain the receptacle from the support, said means comprising an element adapted to make detachable engagement with any one of said handles and an element coöperating therewith to maintain said receptacle in horizontal position, said sustaining means being rotatably secured to the support and thereby permitting movement of the receptacle while sustained to different positions relative to the support.

13. The combination of a suitable support, a receptacle having a plurality of handles arranged in pairs, the handles of each pair being positioned at opposite sides of the receptacle with relation to each other, and means on the support to removably sustain the receptacle from the support in horizontal position and adapted to make detachable engagement with any one of the handles.

14. The combination of a suitable support, a receptacle having a plurality of handles arranged in pairs, the handles of each pair being positioned at diagonally opposite corners of the receptacle with relation to each other, and means on the support to removably sustain the receptacle from the support in horizontal position and adapted to make detachable engagement with any one of the handles.

15. The combination of a suitable support, a receptacle having a plurality of handles and a corner in proximity to each handle, and means on the support adapted to make detachable engagement with the receptacle to removably sustain the same from the support, said means including a part adapted to engage any one of the handles and another part adapted to engage the corner which is in proximity to the handle which is engaged.

16. The combination of a suitable support, a receptacle having a plurality of corners and a handle spanning each of said corners, and means on the support adapted to make detachable engagement with the receptacle to removably sustain the same from the support, said means including a part adapted to engage any one of the handles and another part adapted to engage the corner which is spanned by the handle which is engaged.

17. The combination of a suitable support, a receptacle having an indentation in its outer wall and a handle spanning said indentation, and means on the support adapted to make detachable engagement with the receptacle to removably sustain the same from the support, said means including a part adapted to engage said handle and another part adapted to engage the indentation spanned by said handle.

18. In combination, a receptacle or container provided with a plurality of handles, a support, and means for removably mounting said receptacle on said support, said means having a member that engages one of said handles and a second member that engages the body of said receptacle.

19. In combination, a receptacle or container provided with a plurality of handles, a support, and rotatable means for removably mounting said receptacle on and to swing about said support, said means having a member that engages one of said handles and a second member that engages the body of said receptacle.

20. In combination, a support for receptacles, a plurality of supporting elements rotatably mounted on said support, each of said elements having two receptacle-engaging members, and a receptacle provided with a plurality of handles adapted to be engaged by any one of said elements, one of said members engaging one of said handles and the other engaging the body of said receptacle.

21. In combination, a support for receptacles, a plurality of bearing elements carried thereby, a supporting element rotatably mounted on each of said bearing elements and having two receptacle-engaging members, and a receptacle provided with a plurality of handles adapted to be engaged by any one of said elements, one of said members engaging one of said handles and the other engaging the body of said receptacle.

22. In combination, a support for receptacles, a plurality of supporting elements rotatably mounted on said support, each of said elements having two receptacle-engaging members, and a receptacle provided with a plurality of handles adapted to be engaged by any one of said elements, one of said members hooking around one of said handles and the other having bent-up portions that engage the side of its associated receptacle.

23. In combination, a support for receptacles, a plurality of similar supporting elements mounted on the support in superposed relationship and each provided with two receptacle-engaging members, and a plurality of similar receptacles each having a handle adapted to be detachably engaged by one member of one of the supporting elements and a body adapted to be engaged by the other member of the said supporting element, whereby the said receptacles are supported out of engagement with each other and normally in superposed relationship.

24. A receptacle of substantially cruciform shape with handles spanning the reentrant portions.

25. A receptacle having indented or reentrant portions in its side walls with handles spanning said portions.

26. A receptacle having indented or reentrant portions symmetrically arranged in its side walls with handles spanning said portions.

27. A receptacle having indented or reentrant portions in its side walls with handles spanning said portions along its upper edge.

28. In combination, a receptacle of substantially cruciform shape, handles provided at the reëntrant portions of said receptacle, a support, and means on said support on which said receptacle is removably mounted in horizontal position by one of said handles.

29. In combination, a receptacle of substantially cruciform shape, a wire spanning the reëntrant portions of said receptacle and constituting handles, and a support on which said receptacle is removably mounted in horizontal position by one of said handles.

30. In combination, a receptacle of substantially cruciform shape, a wire spanning the reëntrant portions of said receptacle along its upper edge and constituting handles, and a support on which said receptacle is removably mounted in horizontal position by one of said handles.

31. In combination, a receptacle of substantially cruciform shape, a wire spanning the reëntrant portions of said receptacle and constituting handles, a support for said receptacle, and a supporting element mounted on said support and having two members, one adapted to hook around one of said handles and the other to engage in one of said reëntrant portions of said receptacle.

32. In combination, a receptacle of substantially cruciform shape, a wire spanning the reëntrant portions of said receptacle and constituting handles, a support for said receptacle, and a supporting element rotatably mounted on said support and having two members, one adapted to hook around one of said handles and the other to engage in one of said reëntrant portions of said receptacle.

33. In combination, a receptacle of substantially cruciform shape formed of a single blank of sheet metal, a wire spanning the reëntrant portions of said receptacle and constituting handles therefor, a support, and a supporting element thereon on which said receptacle is removably mounted in horizontal position.

34. In combination, a receptacle of substantially cruciform shape formed of a single blank of sheet metal, a wire spanning the reëntrant portions of said receptacle and constituting handles therefor, a support, and a rotatable supporting element thereon on which said receptacle is removably mounted in horizontal position.

35. The combination with a receptacle having circumferentially spaced reëntrant or indented portions in its side walls, of a removable partitioning means adapted to be held in place by engagement with the inner surfaces of the said indented or reëntrant portions of the side walls.

36. The combination with a receptacle having circumferentially spaced reëntrant or indented portions in its side walls, of a removable partitioning means adapted to be held in place by engagement with the inner surfaces of the said indented or reëntrant portions of the side walls, said partitioning means being formed in a plurality of sections adapted to be compactly nested together.

37. In combination, a receptacle and means for dividing the same into compartments, said means comprising two detachable members each having portions arranged substantially at right angles and fastening devices detachably engaging said members near the juncture-points of the said right-angled portions, the free end of each of said portions being provided with lugs arranged at an angle one to the other which lugs engage the interior of said receptacle.

38. In combination, a receptacle of substantially cruciform shape and means for dividing the same into compartments, said means comprising two members each having portions arranged substantially at right angles, the free end of each of said portions being provided with relatively angularly arranged lugs that engage correspondingly arranged surfaces on the interior of the receptacle.

39. In combination, a receptacle of substantially cruciform shape and means for dividing the same into compartments, said means comprising two members each having portions arranged substantially at right angles, the free end of each of said portions being provided with relatively angularly arranged lugs that engage correspondingly arranged surfaces on the interior of the receptacle, and fastening devices adapted to engage said members near the juncture-points of the said right-angled portions.

40. A receptacle having a body portion of substantially cruciform shape, and a wire passing around the upper edge of said receptacle and being held in place by the material of the receptacle passing around the same, said wire at the reëntrant portions of said receptacle constituting means for transporting or supporting said receptacle.

41. A receptacle having a body portion of substantially cruciform shape formed from a single blank, and a wire passing around the upper edge of said receptacle and being held in place by the material of the receptacle formed around the same, said wire at the reëntrant portions of said receptacle constituting means for transporting or supporting said receptacle.

42. A receptacle having a body portion of substantially cruciform shape, and a wire passing around the upper edge of said receptacle and being held in place by the material of the receptacle passing around the same, said wire passing diagonally across the reëntrant portions of the receptacle.

43. The combination of a receptacle of substantially cruciform shape, and means for dividing the same into compartments, said means comprising two members each having portions arranged substantially at right-angles, the free end of each of said portions being provided with relatively angularly arranged lugs shaped to engage the inner wall of the receptacle at the angles of the reëntrant portions thereof.

44. The combination of a suitable support, a receptacle having a reëntrant corner, a handle bridging said corner, and means rotatably mounted on the support adapted to make detachable engagement with the receptacle to removably sustain the same from the support, said means including a part adapted to engage said handle and a part adapted to engage the aforesaid corner of the receptacle.

45. The combination of a suitable support, a receptacle having a plurality of handles and a corner in proximity to each handle, and means rotatably mounted on said support adapted to make detachable engagement with the receptacle to removably sustain the same from the support, said means including a part adapted to engage any one of the handles and another part adapted to engage the corner which is in proximity to the handle that is engaged.

46. In combination, a support for receptacles, a plurality of supporting elements rotatably mounted on said support, each of said elements having two receptacle-engaging members, and a receptacle provided with indentations, each of which is spanned by a handle adapted to be engaged by any one of said elements, one of said members engaging one of said handles and the other member engaging the body of said receptacle.

47. The combination of a suitable support, a receptacle having a corner, a handle bridging the same, and means on the support adapted to make detachable engagement with the receptacle to removably sustain the same from the support, said means including a part adapted to engage said handle and a part adapted to engage said receptacle to prevent tilting of the same.

48. The combination of a suitable support, a receptacle having an indentation, a handle bridging said indentation, means on the support adapted to make detachable engagement with the handle to removably sustain the receptacle from the support, and means engaging said indentation to prevent tilting of the receptacle.

49. The combination of a suitable support, a receptacle having an indentation, a handle bridging said indentation, means on the support adapted to make detachable engagement with the handle to removably sustain the receptacle from the support, and means engaging said indentation to prevent tilting of the receptacle, said last-named means comprising an arm shaped at its free end to fit said indentation.

50. The combination of a suitable support, a receptacle, means on the support adapted to make detachable engagement with the receptacle to removably sustain the same from the support, and means engaging said receptacle to prevent tilting thereof, said sustaining and tilt-preventing means engaging only lateral and lower surfaces of said receptacle to enable removal of said receptacle by rectilinear vertical movement.

In testimony whereof I have signed this specification in the presence of two subscribing witnesses.

BENJAMIN DENVER COPPAGE.

Witnesses:
H. F. FEENEY,
GEO. E. SANDS.